United States Patent
Hu

(10) Patent No.: US 11,003,953 B2
(45) Date of Patent: May 11, 2021

(54) METHOD FOR IMAGE FORMAT CONVERSION AND DEVICE EMPLOYING THE METHOD

(71) Applicants: HONG FU JIN PRECISION INDUSTRY (WuHan) CO., LTD., Wuhan (CN); HON HAI PRECISION INDUSTRY CO., LTD., New Taipei (TW)

(72) Inventor: Po-Chang Hu, New Taipei (TW)

(73) Assignees: HONG FU JIN PRECISION INDUSTRY (WuHan) CO., LTD., Wuhan (CN); HON HAI PRECISION INDUSTRY CO., LTD., New Taipei (TW)

( * ) Notice: Subject to any disclaimer, the term of this patent is extended or adjusted under 35 U.S.C. 154(b) by 104 days.

(21) Appl. No.: 16/534,059

(22) Filed: Aug. 7, 2019

(65) Prior Publication Data
US 2020/0242401 A1 Jul. 30, 2020

(30) Foreign Application Priority Data
Jan. 25, 2019 (CN) .......................... 201910075931.0

(51) Int. Cl.
*G06K 9/62* (2006.01)
*H04N 1/32* (2006.01)

(52) U.S. Cl.
CPC ....... *G06K 9/6256* (2013.01); *H04N 1/32267* (2013.01)

(58) Field of Classification Search
CPC ........... G06T 7/11; G06T 7/30; G06K 9/4604; G06K 9/468; G06K 9/6256; H04N 1/32267; H04N 1/32459; H04N 1/32475
See application file for complete search history.

(56) References Cited

U.S. PATENT DOCUMENTS 10,460,023 B1 * 10/2019 Shriver ................. G06F 3/0486
2007/0245230 A1 * 10/2007 Cherkasov ........... G06Q 10/101
715/205

* cited by examiner

*Primary Examiner* — Andrew W Johns
(74) *Attorney, Agent, or Firm* — ScienBiziP, P.C.

(57) ABSTRACT

A method for converting images to a unified image format for artificial intelligence deep training comprises acquiring a plurality of images and annotating the plurality of images. An annotation site of the plurality of images is determined to be quadrilateral or polygonal. The format of the annotated images is converted according to a first conversion rule when the annotation site of the annotated training images or the annotated verification images is found to be quadrilateral and the format of the annotated images is converted according to a second conversion rule when the annotation site of the annotated training images or the annotated verification images is found to be not a quadrilateral. A device employing the method is also disclosed.

18 Claims, 4 Drawing Sheets

METHOD FOR IMAGE FORMAT CONVERSION AND DEVICE EMPLOYING THE METHOD

This application claims priority to Chinese Patent Application No. 201910075931.0 filed on Jan. 25, 2019, the contents of which are incorporated by reference herein.

FIELD

The subject matter herein generally relates to data processing in imaging.

BACKGROUND

In the prior art, in artificial intelligence (AI), one or more deep learning models is used for training, and the materials used in AI training need to be in a uniform format.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
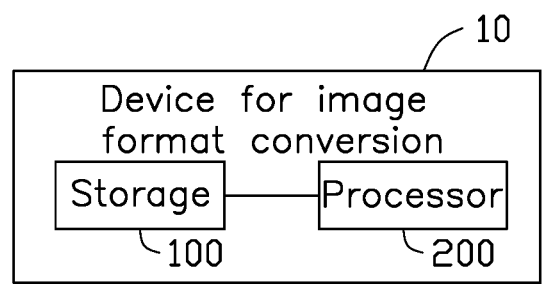
FIG. 1 is a block diagram of an embodiment of a device for image format conversion.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The present disclosure, including the accompanying drawings, is illustrated by way of examples and not by way of limitation. Several definitions that apply throughout this disclosure will now be presented. It should be noted that references to "an" or "one" embodiment in this disclosure are not necessarily to the same embodiment, and such references mean "at least one."

The term "module", as used herein, refers to logic embodied in hardware or firmware, or to a collection of software instructions, written in a programming language, such as, Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY, flash memory, and hard disk drives. The term "comprising" means "including, but not necessarily limited to"; it specifically indicates open-ended inclusion or membership in a so-described combination, group, series, and the like.

FIG. 1 illustrates a device 10 for image format conversion. The device 10 includes a storage 100 and a processor 200. The storage 100 is connected to the processor 200. In one embodiment, the storage 100 stores data for the device 10. In at least one exemplary embodiment, the storage 100 can include various types of non-transitory computer-readable storage mediums. For example, the storage 100 can be an internal storage system of the target service provider server 1, such as a flash memory, a random access memory (RAM) for temporary storage of information, a read-only memory (ROM) for permanent storage of information, a Programmable Read-Only Memory (PROM), an Erasable Programmable Read-Only Memory (EPROM), a One-time Programmable Read-Only Memory (OTPROM), an Electrically-Erasable Programmable Read-Only Memory (EEPROM), and/or a Compact Disc Read-Only Memory (CD-ROM). In another embodiment, the storage 100 can also be an external storage system, such as a hard disk, a storage card, or a data storage medium. In the embodiment, the processor 200 can be a central processing unit, or a common processor, a digital signal processor, a dedicated integrated circuit, ready-made programmable gate arrays or other programmable logic devices, discrete door or transistor logic devices, discrete hardware components, and so on. In another embodiment, the processor 200 can be a microprocessor or any conventional processor. The processor 200 can also be a control center of the device 10, using various interfaces and lines to connect the various parts of the device 10.

In one embodiment, the device 10 for image format conversion acquires images and converts the formats of the images according to a conversion rule. The converted images are used for artificial intelligence (AI) deep learning model training. In one embodiment, the storage 100 stores training images and verification images. The training images are used to train a deep learning model to obtain a deep learning model with certain learning functions. The verification images are used to correct weight values of the deep learning model to improve accuracy of the deep learning model.

The conversion rule includes a first conversion rule and a second conversion rule. The first conversion rule is specifically to annotate one point coordinate of annotation site in the training image or the verification image to get the point coordinate in a first format, and convert the point coordinate in the first format to the point coordinate of a second format according to a preset first mapping relation table. The first mapping relationship table defines a relationship of one point coordinate in the first format and at least two point coordinates in the second format. In one embodiment, the point coordinates in the second format are obtained by a X coordinate (horizontal direction coordinate) of the point coordinate in the first format, a Y coordinate (vertical direction coordinate) point coordinate in the first format, a width of the annotation site in the training image or the verification image, and a height of the annotation site in the training image or the verification image.

The point A1 of point coordinate in the first format is represented by a bounding box ("Bbox"). The Bbox is a rectangular that can cover the annotation site of the image. The annotation site in the image is obtained by using segmentation method, which is a way of annotating image that depicts the outline frame of the image's annotation site in the form of polygon point coordinates. In one embodiment, Bbox covers a rectangular annotation site of the image, and annotates the rectangular annotation site by the segmentation method to get point coordinate of the point A1 in the first format corresponding to the rectangular annotation site.

In one embodiment, by the first formula, the device 10 converts the point coordinate of one point (A1 point) in the first format into the point coordinates of four points (B1, B2, B3, and B4) in the second format, as shown in the first mapping table below.

First Mapping Table

| Conversion object | First format | Second format |
|---|---|---|
| Point coordinate | X coordinate of point A1 | X coordinate of point B1 = X coordinate of point A1 |
| | Y coordinate of point A1 | Y coordinate of point B1 = Y coordinate of point A1 |
| | / | X coordinate of point B2 = X coordinate of point A1 + width |
| | / | Y coordinate of point B2 = Y coordinate of point A1 |
| | / | X coordinate of point B3 = X coordinate of point A1 + width |
| | / | Y coordinate of point B3 = Y coordinate of point A1 + Height |
| | / | X coordinate of point B4 = X coordinate of point A1 |
| | / | Y coordinate of point B4 = Y coordinate of point A1 + Height |

The width in the table is the width of the annotation site in the image corresponding to the point A1, and the Height in the table is the height of the annotation site in the image corresponding to the point A1.

In another embodiment, by the first formula, the device 10 converts the point coordinate of one point (A1 point) in the first format into the point coordinates of the two points (B1 and B2) in the second format or into the point coordinates of the three points (B1, B2, and B3).

The second conversion rule is specifically to annotate at least four point coordinates of annotation site in the training image or the verification image to get one point coordinate in the first format, and convert the point coordinate in the first format to the point coordinate of the second format according to a preset second mapping relation table. The second mapping relationship table defines a relationship of the point coordinate in the first format and the point coordinate in the second format.

The preset second mapping table follows.

Second Mapping Table

| Conversion object | First format | Second format |
|---|---|---|
| Point coordinate | X coordinate of point A1 | X coordinate of point B1 = X coordinate of point A1 |
| | X coordinate of point A2 | Y coordinate of point B1 = Y coordinate of point A1 |
| | X coordinate of point A3 | X coordinate of point B2 = X coordinate of point A3 |
| | X coordinate of point A4 | Y coordinate of point B2 = Y coordinate of point A2 |
| | Y coordinate of point A1 | X coordinate of point B3 = X coordinate of point A3 |
| | Y coordinate of point A2 | Y coordinate of point B3 = Y coordinate of point A3 |
| | Y coordinate of point A3 | X coordinate of point B4 = X coordinate of point A4 |
| | Y coordinate of point A4 | Y coordinate of point B4 = Y coordinate of point A4 |

In one embodiment, Bbox covers a rectangular annotation site of the image, and annotates the rectangular by the segmentation method to get point coordinate of the points B1, B2, B3, and B4 in the first format corresponding to the rectangular.

In one embodiment, the first format of the image includes, but is not limited to, image annotation format for VGG Image Annotator (VIA). The second format of the image includes, but is not limited to, image annotation format for Microsoft Common Objects in Context dataset (MS COCO dataset). The image annotation format for MS COCO dataset has a fixed format, and all images using image annotation format for MS COCO dataset need to be converted to a standard format to be loaded into the AI deep learning model for training.

Figure 2:
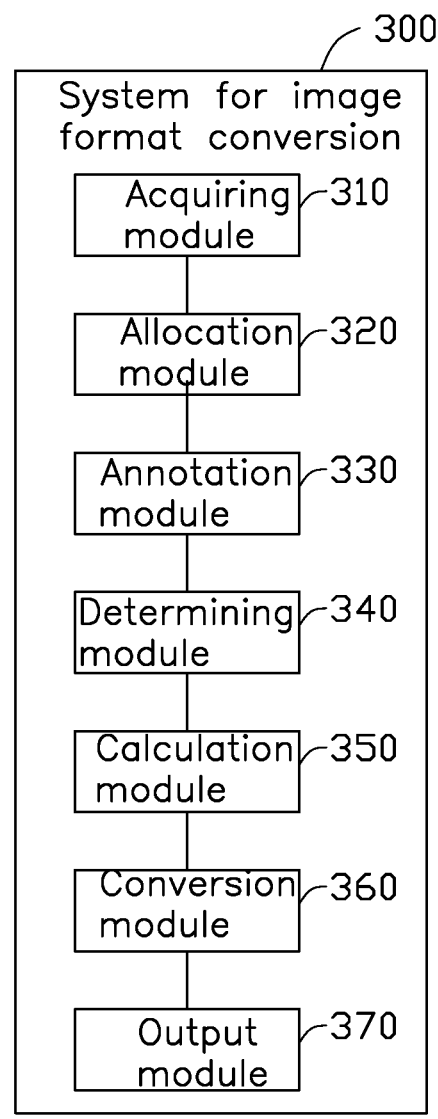
FIG. 2 is a block diagram of an embodiment of a system for image format conversion.

FIG. 2 illustrates system 300 for image format conversion. The system 300 includes one or more modules, which are running in the device 10. The system 300 includes an acquiring module 310, allocation module 320, an annotation module 330, a determining module 340, a calculation module 350, a conversion module 360, and an output module 370. In one embodiment, the acquiring module 310, the allocation module 320, the annotation module 330, the determining module 340, the calculation module 350, the conversion module 360, and the output module 370 are stored in the storage 100 of the device 10 and executed by the processor 200 of the device 10. In another embodiment, the acquiring module 310, the allocation module 320, the annotation module 330, the determining module 340, the calculation module 350, the conversion module 360, and the output module 370 are program segments or code embedded in the processor 200.

The acquiring module 310 acquires the images. In one embodiment, after format conversion, the acquired images is used to train the AI deep learning model.

The allocation module 320 allocates the acquired images either as training images or as verification images. In one embodiment, the allocation module 320 allocates the acquired images as training images or verification images according to a preset ratio. In one embodiment, 70% of the images are allocated as the training pictures, and 30% of the images are allocated as the verification pictures. The training images and verification images are respectively stored in a training file and a verification file.

The annotation module 330 annotates the training images and the verification images. In one embodiment, the annotation module 330 annotates the training images or the verification images to get annotation information of the training images or the verification images. The annotation information includes basic information, licensing information, classification information, image information, and annotation content.

The basic information includes, but is not limited to, file creation time, file version, and URL of files that stores the training images or the verification images, and file creation time, file version, and URLs of files that store the annotated training images or the annotated verification images. The files that store the training images or the verification images include a training file and a verification file. The files that store the annotated training images or the annotated verification images includes subfiles that store the annotated training images or the annotated verification images in batches, and a target file consisting of the subfiles.

The licensing information includes, but is not limited to, file version of the training images or the verification images. The classification information includes, but is not limited to, classification information of the training images or the verification images. The image information includes, but is not limited to, width, height, image name, and reading time of the training images or the verification images. The annotation content includes, but is not limited to, image classification, point coordinate, and image boundary information. The point coordinate is represented as the Bbox. The annotation site in the training images or the verification images is obtained by using segmentation method, which is a way of annotating an image that depicts the outline frame of the image's annotation site in the form of polygon point coordinates.

The annotation information is fixed and needs to be defined in advance. The basic information, the licensing information, and the image information are defined as a basis for conversion, and set independently into a file as a basic archives such as an OIA template.

In one embodiment, the image format of the training images and the verification images is converted based on the base archive, the image information, and the annotation content.

The determining module 340 determines whether the annotation site of the annotated training images and the annotated verification images is a quadrilateral according to a preset rule. In one embodiment, when determining that the number of annotation sites of the annotated training images and the annotated verification images is four, the determining module 340 determines that the annotation site of the annotated training images and the annotated verification images is a quadrilateral. When determining that the number of annotation sites of the annotated training images and the annotated verification images is more than four, the determining module 340 determines that the annotation site of the annotated training images and the annotated verification images is a polygon.

The calculation module 350 calculates an area of the annotation site of the annotated training image and the annotated verification image. In one embodiment, the area of the annotation site of the annotated training image and the annotated verification image can be acquired by the Application Programming Interface (API). The is a pre-defined function that calculates the area of the annotation site to provide applications with access to a set of routines based on a piece of software or hardware without having to access the source code or understanding the details of the internal workings.

The conversion module 360 converts the format of the annotated training image and the annotated verification image according to the conversion rule. The conversion rule is stored in the storage 100 and the conversion rule includes a first conversion rule and a second conversion rule. When the annotation site of the annotated training image or the annotated verification image is a regular quadrilateral, the conversion module 360 converts the format of the annotated training image or the annotated verification image according to the first conversion rule. When the annotation site of the annotated training image or the annotated verification image is a polygon, the conversion module 360 converts the format of the annotated training image or the annotated verification image according to the second conversion rule.

The output module 370 outputs the training image and the verification image which have converted formats. In one embodiment, the training image and the verification image with format converted are used to train the AI deep learning model to improve the accuracy of the AI deep learning mode.

Figure 3:
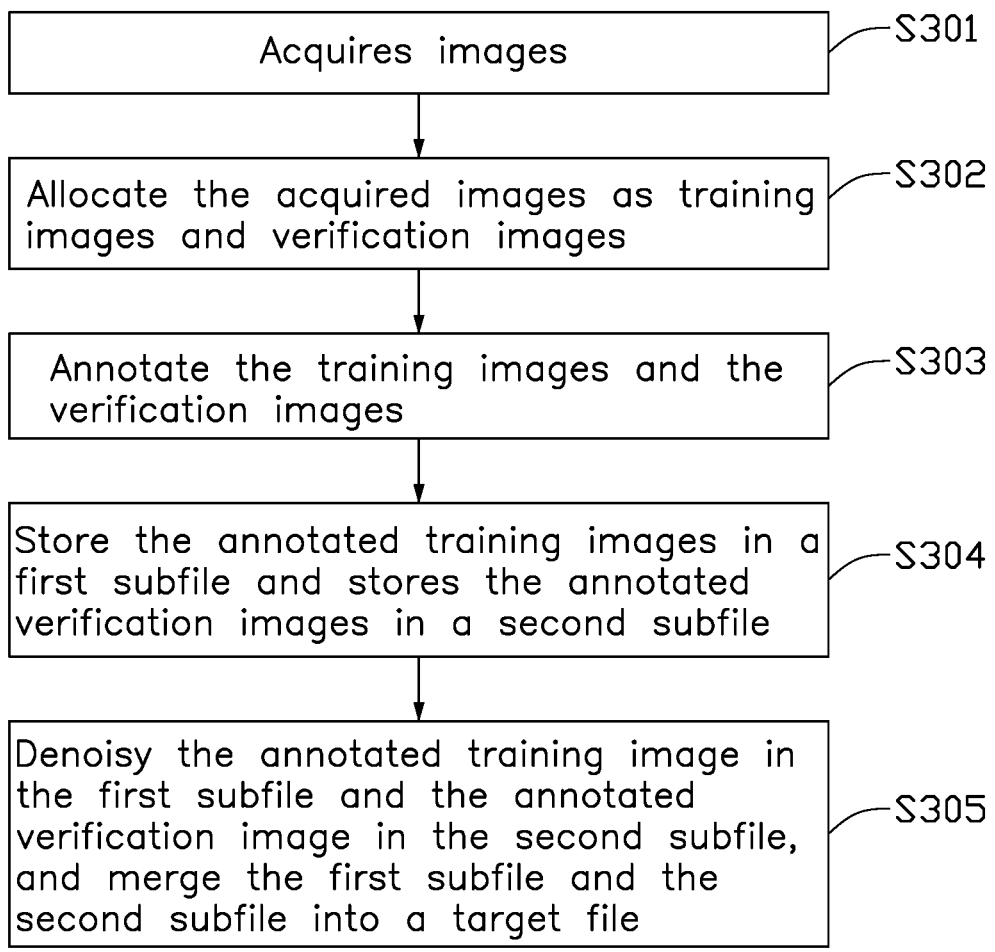
FIG. 3 is a flowchart of an embodiment of a method for annotating image.

FIG. 3 illustrates a flowchart of an embodiment of a method for image format conversion. The method is provided by way of example, as there are a variety of ways to carry out the method. The method described below can be carried out using the configurations illustrated in FIGS. 1-2, for example, and various elements of these figures are referenced in explaining the example method. Each block shown in FIG. 3 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at block 301.

At block 301, a device for image format conversion acquires the images.

In one embodiment, a storage of the device stores the images, and the device acquires the images from the storage.

At block 302, the device allocates the acquired images either as training images or as verification images.

In one embodiment, the device allocates the acquired images as training images or verification images according to a preset ratio. In one embodiment, 70% of the images are allocated as the training picture, and 30% of the images are allocated as the verification picture. The training images and verification images are respectively stored in a training file and a verification file.

At block 303, the device annotates the training images and the verification images.

In one embodiment, the device annotates the raining images or the verification images to get annotation information of the training images or the verification images. The annotation information includes basic information, licensing information, classification information, image information, and annotation content.

The basic information includes, but is not limited to, file creation time, file version, and URL of files that store the training images or the verification images, and file creation time, file version, and URL of files that store the annotated training images or the annotated verification images. The files that store the training images or the verification images include a training file and a verification file. The files that store the annotated training images or the annotated verification images includes subfiles that store the annotated training images or the annotated verification images in batches, and a target file consisting of the subfiles.

The licensing information includes, but is not limited to, file version of the training images or the verification images. The classification information includes, but is not limited to, classification information of the training images or the verification images. The image information includes, but is not limited to, width, height, image name, and reading time of the training images or the verification images. The annotation content includes, but is not limited to, image classification, point coordinate, and image boundary information. The point coordinate is represented as the Bbox. The annotation site in the training images or the verification images is obtained by using segmentation method, which is a way of annotating image that depicts the outline frame of the image's annotation site in the form of polygon point coordinates.

The annotation information is fixed and needs to be defined in advance. The basic information, the licensing information, and the image information are defined as a basis for conversion, and set independently into a file as a basic archive such as an OIA template.

In other embodiment, the device annotates the acquired images and allocates the annotated image either as the training images or as the verification images.

At block 304, the device stores the annotated training images in a first subfile and stores the annotated verification images in a second subfile.

In one embodiment, the device further names the first subfile and the second subfile and the storage of the device stores the name of the first subfile and the second subfile, and the storage paths of the first subfile and the second subfile. In one embodiment, storing the annotated training images in a first subfile and storing the annotated verification images in a second subfile allows convenient searching, reduces unnecessary processing of images, and speeds the processing.

At block 305, the device denoises the annotated training image in the first subfile and the annotated verification image in the second subfile, and merges the first subfile and the second subfile into a target file. In one embodiment, the device denoises the annotated training image in the first subfile to remove redundant image information of the annotated training image, and denoises the annotated verification image in the second subfile to remove redundant image information of the annotated verification image. As the first subfile and the second subfile are continuous and additive, the device can merge the first subfile and the second subfile into the target file. In one embodiment, the annotated training images are stored in multiple first subfiles, and the annotated verification images are stored in multiple second subfiles. The multiple first subfiles which store the annotated training images are merged into a training target file, and the multiple second subfiles which store the annotated verification images are merged into a verification target file.

Figure 4:
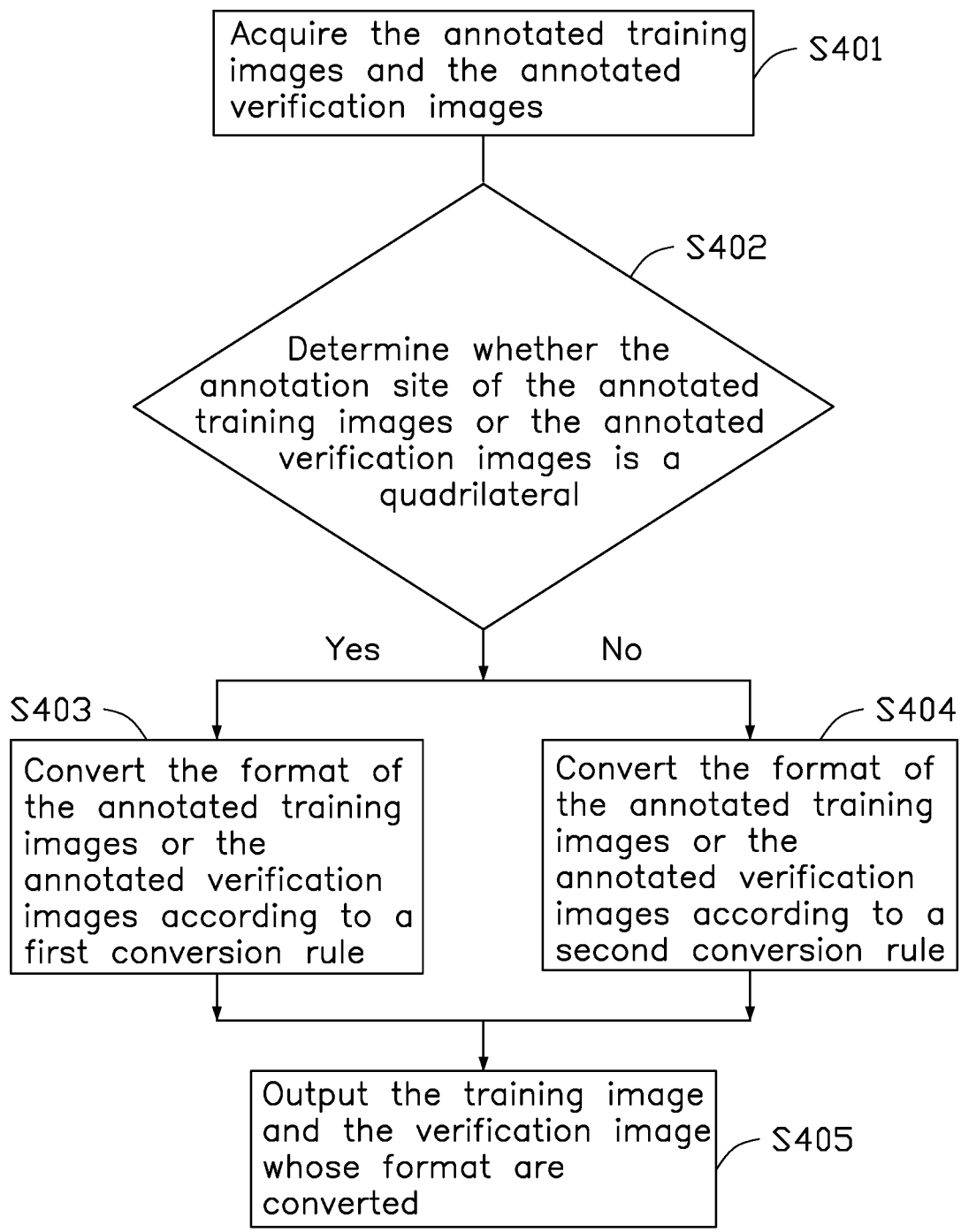
FIG. 4 is a flowchart of an embodiment of a method for image format conversion.

FIG. 4 illustrates another flowchart of an embodiment of a method for image format conversion. The method is provided by way of example, as there are a variety of ways to carry out the method. The example method can begin at block 401.

At block 401, the device acquires the annotated training images and the annotated verification images.

In one embodiment, the device acquires the annotated training images from the training target file, and acquires the annotated verification images from the verification target file.

At block 402, the device determines whether the annotation site of the annotated training images or the annotated verification images is a quadrilateral. When the annotation site of the annotated training images or the annotated verification images is a quadrilateral, block 403 is executed, otherwise, block 404 is executed.

In one embodiment, the device determines whether the annotation site of the annotated training images and the annotated verification images is a quadrilateral according to a preset rule. When determining that the number of the annotation sites of the annotated training images and the annotated verification images is four, the device determines that the annotation site of the annotated training images and the annotated verification images is a quadrilateral. When determining that the number of the annotation sites of the annotated training images and the annotated verification images is more than four, the device determines that the annotation site of the annotated training images and the annotated verification images is a polygon.

At block 403, the device converts the format of the annotated training images or the annotated verification images according to a first conversion rule.

The first conversion rule is specifically to annotate one of point coordinates of annotation site in the training image or the verification image to get the point coordinate in a first format, and convert the point coordinate in the first format to be the point coordinate in the second format according to a preset first mapping relation table. The first mapping relationship table defines a relationship of one point coordinate in the first format and at least two point coordinates in the second format. In one embodiment, the point coordinate in the second format are obtained by a X coordinate (horizontal direction coordinate) of the point coordinate in the first format, a Y coordinate (vertical direction coordinate) point coordinate in the first format, a width of the annotation site in the annotated training image or the annotated verification image, and a height of the annotation site in the annotated training image or the annotated verification image.

In one embodiment, by the first formula, the device converts the point coordinate of one point (A1 point) in the first format into the point coordinates of the four points (B1, B2, B3, and B4) in the second format, as shown in the first mapping table below.

| | First Mapping Table | |
|---|---|---|
| Conversion object | First format | Second format |
| Point coordinate | X coordinate of point A1 | X coordinate of point B1 = X coordinate of point A1 |
| | Y coordinate of point A1 | Y coordinate of point B1 = Y coordinate of point A1 |
| | / | X coordinate of point B2 = X coordinate of point A1 + width |
| | / | Y coordinate of point B2 = Y coordinate of point A1 |
| | / | X coordinate of point B3 = X coordinate of point A1 + width |
| | / | Y coordinate of point B3 = Y coordinate of point A1 + Height |
| | / | X coordinate of point B4 = X coordinate of point A1 |
| | / | Y coordinate of point B4 = Y coordinate of point A1 + Height |

At block 404, the device converts the format of the annotated training images or the annotated verification images according to a second conversion rule.

The second conversion rule is specifically to annotate at least four point coordinates of annotation site in the annotated training images or the annotated verification images to get one point coordinate in the first format, and convert the point coordinate in the first format to the point coordinate in the second format according to a preset second mapping relation table. The second mapping table defines a conversion relationship of the point coordinate in the first format and the point coordinate in the second format.

The preset second mapping table follows.

Second Mapping Table

| Conversion object | First format | Second format |
|---|---|---|
| Point coordinate | X coordinate of point A1 | X coordinate of point B1 = X coordinate of point A1 |
| | X coordinate of point A2 | Y coordinate of point B1 = Y coordinate of point A1 |
| | X coordinate of point A3 | X coordinate of point B2 = X coordinate of point A3 |
| | X coordinate of point A4 | Y coordinate of point B2 = Y coordinate of point A2 |
| | Y coordinate of point A1 | X coordinate of point B3 = X coordinate of point A3 |
| | Y coordinate of point A2 | Y coordinate of point B3 = Y coordinate of point A3 |
| | Y coordinate of point A3 | X coordinate of point B4 = X coordinate of point A4 |
| | Y coordinate of point A4 | Y coordinate of point B4 = Y coordinate of point A4 |

In one embodiment, the device calculates an area of the annotation site of the annotated training images or the annotated verification images, and converts the point coordinate in the first format to the point coordinate in the second format according to the area of the annotation site of the annotated training images or the annotated verification images. In one embodiment, the areas of the annotation site of the annotated training image and the annotated verification image can be acquired by the Application Programming Interface (API). The is a pre-defined function that calculates the area of the annotation site of the annotated training image and the annotated verification image.

At block 405, the device outputs the training image and the verification image which have converted formats.

In one embodiment, the training image and the verification image with format converted are used to train the AI deep learning model to improve the accuracy of the AI deep learning mode.

It should be emphasized that the above-described embodiments of the present disclosure, including any particular embodiments, are merely possible examples of implementations, set forth for a clear understanding of the principles of the disclosure. Many variations and modifications can be made to the above-described embodiment(s) of the disclosure without departing substantially from the spirit and principles of the disclosure. All such modifications and variations are intended to be included herein within the scope of this disclosure and protected by the following claims.

What is claimed is:

1. A method for image format conversion, comprising:
acquiring a plurality of images;
annotating the plurality of images;
determining whether an annotation site of the plurality of images is a quadrilateral;
converting a format of annotated images according to a first conversion rule when an annotation site of the annotated images is a quadrilateral; and converting the format of the annotated images according to a second conversion rule when the annotation site of the annotated images is not a quadrilateral.

2. The method as recited in claim 1, wherein the first conversion rule is to annotate one of point coordinates of the annotation site in the images to obtain a point coordinate in a first format, and convert the point coordinate in the first format to be the point coordinate in the second format according to a preset first mapping relation table.

3. The method as recited in claim 2, wherein the first mapping relationship table defines a relationship of one point coordinate in the first format and at least two point coordinates in the second format, the point coordinate in the second format are obtained by a X coordinate of the point coordinate in the first format, a Y coordinate point coordinate in the first format, a width of the annotation site in the annotated images, and a height of the annotation site in the images.

4. The method as recited in claim 1, wherein the second conversion rule is to annotate at least four point coordinates of the annotation site in the images to obtain one point coordinate in the first format, and convert the point coordinate in the first format to be the point coordinate in the second format according to a preset second mapping relation table, wherein the second mapping relationship table defines a conversion relationship of the point coordinate in the first format and the point coordinate in the second format.

5. The method as recited in claim 1, further comprising:
allocating the acquired images as training images and verification images, and storing the training images in a training file, and storing the verification images in a verification file.

6. The method as recited in claim 5, further comprising:
annotating the training images or the verification images to obtain annotation information of the training images or the verification images, wherein the annotation information comprises basic information, licensing information, classification information, image information, and annotation content.

7. A device for image format conversion, comprising:
a processor;
a non-transitory storage medium coupled to the processor and configured to store a plurality of instructions, which causes the device to:
acquire a plurality of images;
annotate the plurality of images;
determine whether an annotation site of the plurality of images is a quadrilateral;
convert a format of annotated images according to a first conversion rule when an annotation site of the annotated images is a quadrilateral; and
convert the format of the annotated images according to a second conversion rule when the annotation site of the annotated images is not a quadrilateral.

8. The device as recited in claim 7, wherein the first conversion rule is to annotate one of point coordinates of the annotation site in the images to obtain a point coordinate in a first format, and convert the point coordinate in the first format to be the point coordinate in the second format according to a preset first mapping relation table.

9. The device as recited in claim 8, wherein the first mapping relationship table defines a relationship of one point coordinate in the first format and at least two point coordinates in the second format, the point coordinate in the second format are obtained by a X coordinate of the point coordinate in the first format, a Y coordinate point coordinate in the first format, a width of the annotation site in the annotated images, and a height of the annotation site in the images.

10. The device as recited in claim 7, wherein the second conversion rule is to annotate at least four point coordinates of the annotation site in the images to obtain one point coordinate in the first format, and convert the point coordinate in the first format to be the point coordinate in the second format according to a preset second mapping relation table, wherein the second mapping relationship table defines a conversion relationship of the point coordinate in the first format and the point coordinate in the second format.

11. The device as recited in claim 7, wherein the plurality of instructions is further configured to cause the device:
allocate the acquired images as training images and verification images, and store the training images in a training file, and store the verification images in a verification file.

12. The device as recited in claim 11, wherein the plurality of instructions is further configured to cause the device:
annotate the training images or the verification images to get annotation information of the training images or the verification images, wherein the annotation information comprises basic information, licensing information, classification information, image information, and annotation content.

13. A non-transitory storage medium having stored thereon instructions that, when executed a processor of a device for image format conversion, causes the processor to execute instructions of a method for image amplification and annotation, the method comprising:
acquiring a plurality of images;
annotating the plurality of images;
determining whether an annotation site of the plurality of images is a quadrilateral;
converting a format of annotated images according to a first conversion rule when an annotation site of the annotated images is a quadrilateral; and
converting the format of the annotated images according to a second conversion rule when the annotation site of the annotated images is not a quadrilateral.

14. The non-transitory storage medium as recited in claim 13, wherein the first conversion rule is to annotate one of point coordinates of the annotation site in the images to obtain a point coordinate in a first format, and convert the point coordinate in the first format to be the point coordinate in the second format according to a preset first mapping relation table.

15. The non-transitory storage medium as recited in claim 14, wherein the first mapping relationship table defines a relationship of one point coordinate in the first format and at least two point coordinates in the second format, the point coordinate in the second format are obtained by a X coordinate of the point coordinate in the first format, a Y coordinate point coordinate in the first format, a width of the annotation site in the annotated images, and a height of the annotation site in the images.

16. The non-transitory storage medium as recited in claim 13, wherein the second conversion rule is to annotate at least four point coordinates of the annotation site in the images to obtain one point coordinate in the first format, and convert the point coordinate in the first format to be the point coordinate in the second format according to a preset second mapping relation table, wherein the second mapping relationship table defines a conversion relationship of the point coordinate in the first format and the point coordinate in the second format.

17. The non-transitory storage medium as recited in claim 13, further comprising:
allocating the acquired images as training images and verification images, and storing the training images in a training file, and storing the verification images in a verification file.

18. The non-transitory storage medium as recited in claim 17, further comprising:
annotating the training images or the verification images to get annotation information of the training images or the verification images, wherein the annotation information comprises basic information, licensing information, classification information, image information, and annotation content.

* * * * *